Patented Sept. 15, 1931

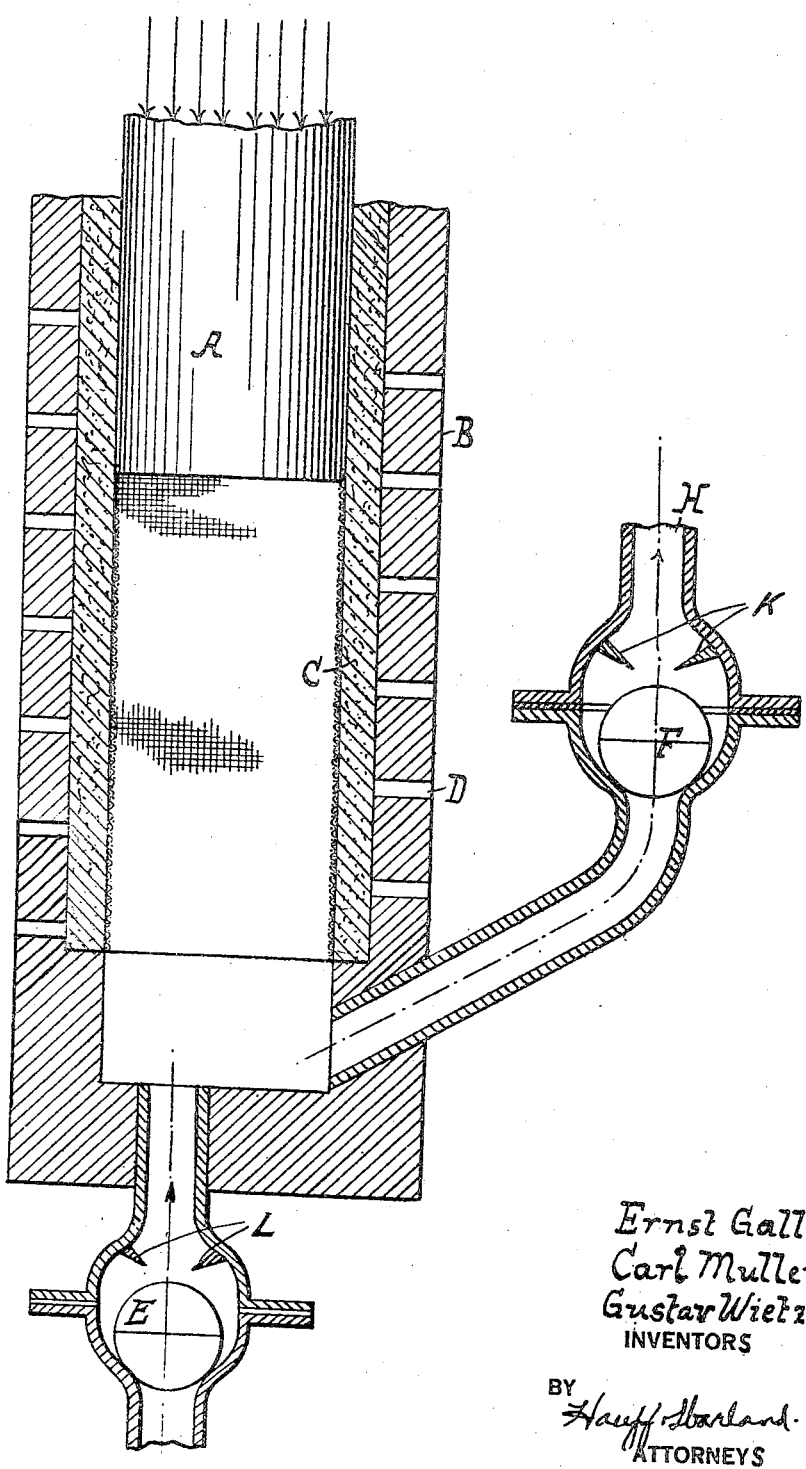

1,823,116

UNITED STATES PATENT OFFICE

CARL MÜLLER, OF MANNHEIM, GUSTAV WIETZEL AND ERNST GALLE, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

CONVERSION OF SOLID FUELS

Application filed November 22, 1926, Serial No. 150,146, and in Germany November 26, 1925.

We have found that solid carbonizable fuels containing moisture such as moist coal, crude brown coal (lignite), peat and the like can be advantageously prepared for conversion by destructive hydrogenation by means of hydrogen into valuable liquid products by removing all or the greater part of their water contents in the following manner. The fuel is mixed with destructive distillates recovered from products obtained by destructive hydrogenation of carbonaceous materials by the action of hydrogen under strong pressure such as hydrocarbons of the nature of middle oil or of benzene like character and the mixture so obtained is subjected to a compression treatment as for example pressing or centrifuging, by which treatment the whole or greater part of the water is squeezed out together with small amounts of the liquid hydrogenation products added. The mixture of water and the said liquid hydrogenation products is drawn off and separates in layers on standing, so that the liquid hydrogenation products can easily be recovered and employed again in the process. Generally, it will be sufficient to carry out the said operation for removal of water only once, but this treatment may also be applied several times, as for example if the said solid fuel is very wet or if it is desired to remove the water to the greatest extent possible. In most cases it is advantageous to carry out the pressure treatment for the removal of water with thin layers of the material undergoing treatment.

In the process according to the present invention it is advantageous to grind the moist solid fuels to a comminuted condition and making up a paste of them with oil before subjecting them to the said compression treatment. The treatment itself may be carried out at ordinary or slightly elevated temperatures and at pressures of about 200 atmospheres but also lower or higher pressures may be employed. It is however preferable to employ pressures which are higher than 50 atmospheres. In this manner it is possible to squeeze out the water also from coals containing a high percentage thereof to a percentage of about 5 percent in one operation. This percentage may be further reduced by repeating the treatment according to the present invention.

The process according to our invention becomes particularly economical when the pressure treatment for the removal of water is connected with the introduction of the fuel into the hydrogenating vessel in which pressure prevails, as in this case the work of compressing the fuel need be done only once. The addition of the said liquid products of destructive hydrogenation has the advantage that the water is removed from the initial materials more effectively and the subsequent destructive hydrogenation of these materials has the advantage that none of these destructive hydrogenation products are wasted by remaining in the fuel.

The invention will further be illustrated by the accompanying drawing showing in vertical section a cylindrical press embodying the invention. The press consists of a shell B adapted to withstand high pressures and containing a number of drain holes D, the inner surface of the said shell being covered with a filtering jacket C. This filtering jacket may be composed of fine sand or fine pumice or several layers of thick filtering cloth, which materials are supported by a wire net M. A piston A covering the whole free inner area of the press is movably arranged in the said press. When drawing back the piston A a mixture of moist solid fuel and liquid hydrogenation products of such solid fuels is sucked into the press through tube G. Thorns L prevent the ball valve E from stopping the flow of the material sucked in through tube G. On pushing forward the piston A tube G is shut off by the valve-ball E and the moist fuel mixture is squeezed out by the piston A, the water passes through the filtering jacket C and is drained off through the tubes D. By increasing the pressure applied to piston A the valve F, shutting off the connection between the press and the tube H leading to the hydrogenation vessel in which a high pressure prevails, is opened so that the pasty fuel mixture from which the water has been pressed out passes into the hydrogenation vessel, thus enabling the pressure, applied for squeezing the water content out, to be simultaneously used for feeding fresh initial material into the hydrogenation vessel. Thorns K prevent the ball valve F from stopping the flow of the materials through the tube H. On releasing the pressure on piston A the connection between the hydrogenation vessel and the press is shut up.

The following example will further illustrate how the present invention may be carried out in practice, but the invention is not limited to this example. The parts are by weight.

*Example*

100 parts of moist lignite as it comes from the mine are mixed with 25 parts of a liquid hydrogenation product of such lignite. The water content is removed from the mixture by exposing it to a pressure of 300 atmospheres in a press as described above. The material is then conveyed into the pressure hydrogenating apparatus by means of the said high pressure. In said apparatus, the fuel is converted into valuable liquid products by treatment with hydrogen at 400° C. under the said pressure; part of the products so obtained is employed for removing water from fresh initial material in the manner described.

We claim:

1. In the conversion of moist solid carbonizable fuels into valuable liquid products by destructive hydrogenation, the preliminary step of mixing the fuel in a comminuted state with a distillate recovered from a product obtained by destructive hydrogenation of carbonaceous materials, subjecting the mixture to compression at a pressure of at least 50 atmospheres for removing water therefrom, while avoiding strongly elevated temperatures, and causing the liquid squeezed out to become separated from the mixture.

2. In the conversion of moist solid carbonizable fuels into valuable liquid products by destructive hydrogenation, the preliminary step of mixing the fuels in a comminuted state with a distillate recovered from a product obtained by destructive hydrogenation of carbonaceous materials, subjecting the mixture to compression at a pressure of at least 50 atmospheres for removing water therefrom, while excluding strongly elevated temperatures, causing the liquid squeezed out to become separated from the mixture and then conveying the remaining mixture of solid fuel and hydrogenation products into the vessel, in which destructive hydrogenation is effected and in which high pressure prevails, by means of the high pressure employed for the removal of water.

In testimony whereof we have hereunto set our hands.

CARL MÜLLER.
GUSTAV WIETZEL.
ERNST GALLE.